(12) United States Patent
McHugh et al.

(10) Patent No.: US 6,384,574 B1
(45) Date of Patent: May 7, 2002

(54) BATTERY SYSTEM

(75) Inventors: William T. McHugh, Westwood; Robert A. Scalisi, Medford; Gary M. Searle, Norfolk; Robert Theriault, Newton, all of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/693,010

(22) Filed: Oct. 20, 2000

(51) Int. Cl.⁷ .................................................. H02J 7/00
(52) U.S. Cl. ........................................ 320/107; 320/101
(58) Field of Search .................................. 320/107, 101; 429/27, 38, 82, 96, 99

(56) References Cited

U.S. PATENT DOCUMENTS 4,177,327 A    12/1979  Matthews et al. ............ 429/27
5,554,452 A  *  9/1996  Delmolino et al. ........... 429/10
6,296,961 B1 * 10/2001  Moy et al. ..................... 429/27

FOREIGN PATENT DOCUMENTS

| WO | WO 00/36689 | 6/2000 |
| WO | WO 00/36691 | 6/2000 |
| WO | WO 00/36693 | 6/2000 |

* cited by examiner

*Primary Examiner*—Jessica Han
*Assistant Examiner*—Lawrence Luk
(74) *Attorney, Agent, or Firm*—Fish & Richardson P.C.

(57) ABSTRACT

A battery cartridge includes a casing, a battery in the casing, and a slide moveably engaged with the casing. The battery has an opening, and the slide has an opening alignable with the opening of the battery.

18 Claims, 10 Drawing Sheets

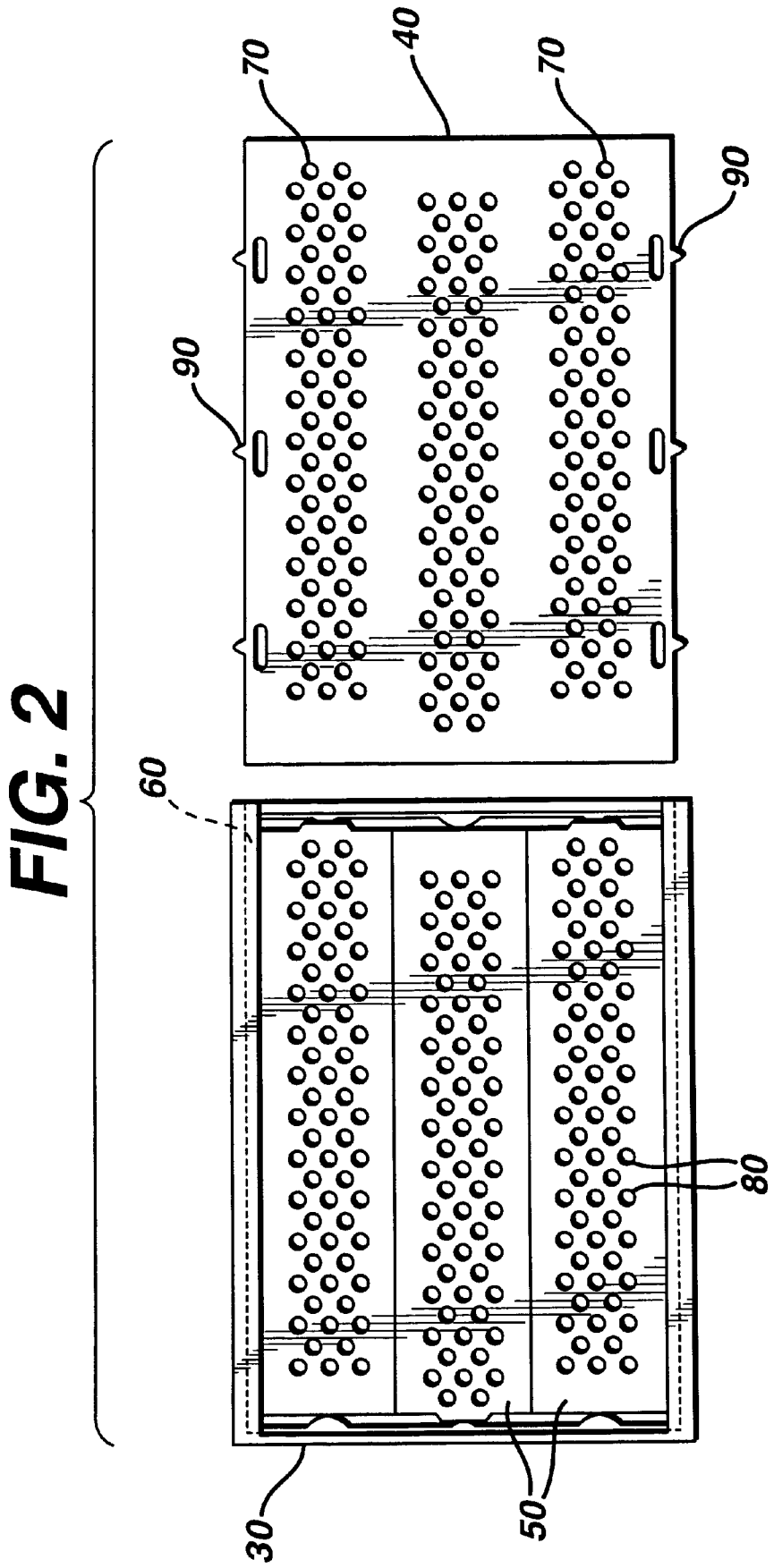

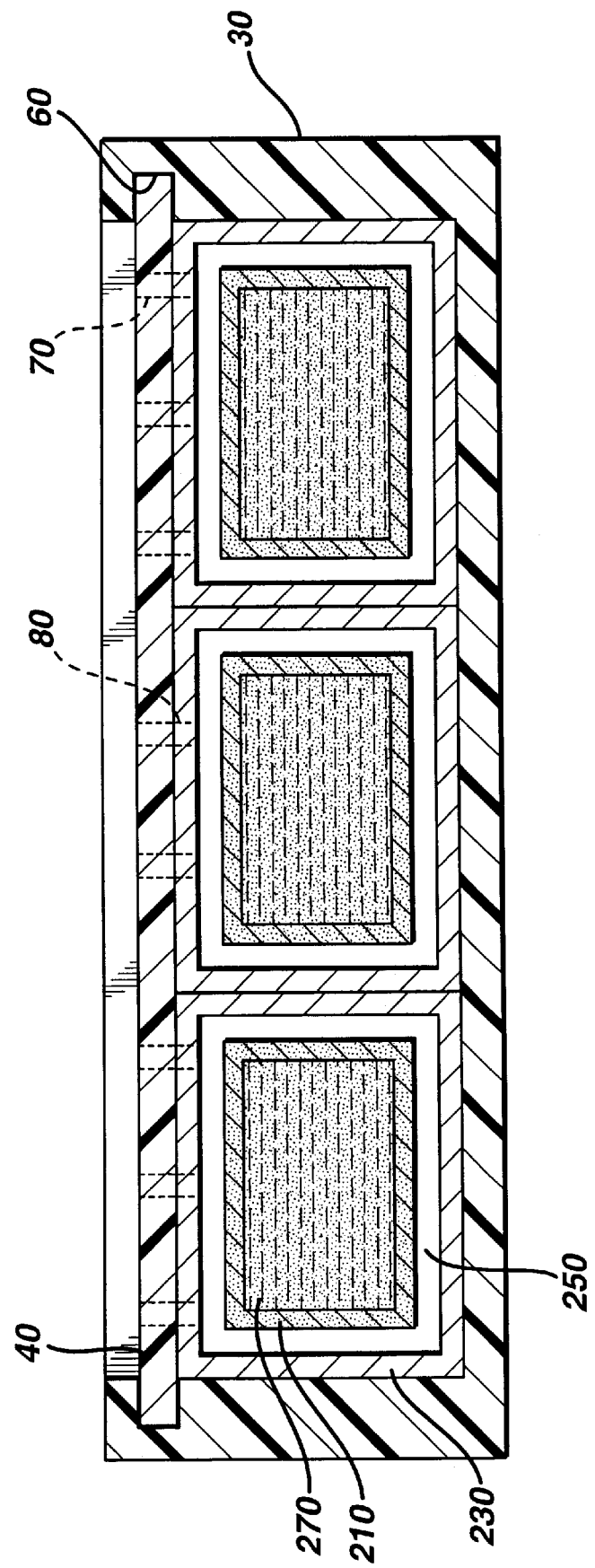

BATTERY SYSTEM

BACKGROUND

This invention relates to metal-air batteries.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, electrical contact is made to the anode and the cathode, allowing electrons to flow through the device and permitting the respective oxidation and reduction reactions to occur to provide electrical power. An electrolyte, for example, potassium hydroxide, in contact with the anode and the cathode contains ions that flow through the separator between the electrodes to maintain charge balance throughout the battery during discharge.

In a metal-air electrochemical cell, oxygen is reduced at the cathode, and a metal is oxidized at the anode. Oxygen is supplied to the cathode from the atmospheric air external to the cell through one or more air hole(s) in the cell can. To prolong battery life, it is desirable that the cathode be exposed to air flow when in use, and isolated from air flow when not in use.

SUMMARY

The invention relates to a metal-air battery cartridge that, when used in a device, provides good air management according to the power requirements of the device. Generally, the cartridge seals a battery inside the cartridge from air when the device is off and exposes the battery to air when the device is on.

In certain devices requiring batteries, such as in some cellular telephones, the batteries are not subject to continuous use. Rather, the batteries are subject to intermittent use in which the batteries cycle between an "off" mode and an "on" mode of operation. During the off mode, no current is drawn from the batteries; and during the on mode, the maximum current may be drawn. Some telephones also have a "standby" mode of operation in which a non-maximum amount of current is drawn.

During the periods of time when these devices are not on, it is desirable to limit or restrict the amount of air that enters the batteries. Overexposure to air can lead to premature degradation of the materials in the batteries. For example, carbon dioxide can react with a potassium hydroxide electrolyte to form potassium carbonate. This can lead to poor battery performance and a reduced battery life.

In one aspect, the invention features a battery cartridge including a casing, a battery in the casing, and a slide moveably engaged with the casing. The battery includes an opening, and the slide includes an opening alignable with the opening of the battery.

Embodiments may include one or more of the following features.

The slide can be moveable between a first position in which the opening of the slide is aligned with the opening of battery, and a second position in which the opening of the slide is misaligned with the opening of battery. The slide can be further moveable to a third position in which the opening of the slide is partially aligned with the opening of the battery. The casing can define a groove, and the slide can be moveably engaged in the groove.

The slide can further include at least one latch, which can retain the slide at a predetermined engagement position with the casing. The latch can be integrally molded in the slide.

The cartridge can further include an auxiliary power source adapted to move the slide. The auxiliary power source can be a second battery.

The casing can have a prismatic shape, e.g., a rectangular prism and a circular prism.

The battery can have a rectangular cross section. The battery can be a metal-air battery, e.g., one that includes a cathode having manganese dioxide and an anode having zinc.

In another aspect, the invention features an electrochemical power source having a metal-air battery system including an opening and air control member arranged for relative sliding motion to variably cover the opening for controlling exposure to an oxygen-containing environment.

In another aspect, the invention features an electrochemical power source having a metal-air battery system including a pair of openings in parallel planar arrangement. The openings are arranged for variable alignment to control exposure to an oxygen-containing environment.

The battery cartridge provides a simple and functional system for managing air flow into a metal-air battery. The cartridge can be formed in a variety of shapes to suit different devices, and the cartridge can be produced at a low cost. Operation of the cartridge is simple. In some embodiments, operation of the cartridge is transparent to the user.

A prismatic battery can be generally rectangularly shaped. For example, a prismatic battery can be relatively flat with two parallel rectangularly-shaped faces, making them suitable for use in cellular telephones. More broadly, a prismatic battery can be shaped as a polyhedron with two polygonal faces lying in parallel planes and with the other faces, if any, as parallelograms. For example, if the polygonal faces are rectangular, then the battery is shaped as a rectangular prism. If the polygonal faces are circular, then the battery is shaped as a circular prism. Prismatic batteries can be efficiently and conveniently stacked together, e.g., in a cellular telephone and in a battery cartridge.

Other features, objects, and advantages of the invention will be apparent from the description and drawings, and from the claims.

DESCRIPTION OF DRAWINGS

FIG. 2 is a top view of an embodiment of a battery cartridge;

FIG. 3 is a cross-sectional view of an embodiment of a battery cartridge;

DETAILED DESCRIPTION OF THE PREFERRED EMBODIMENT

Figure 1:
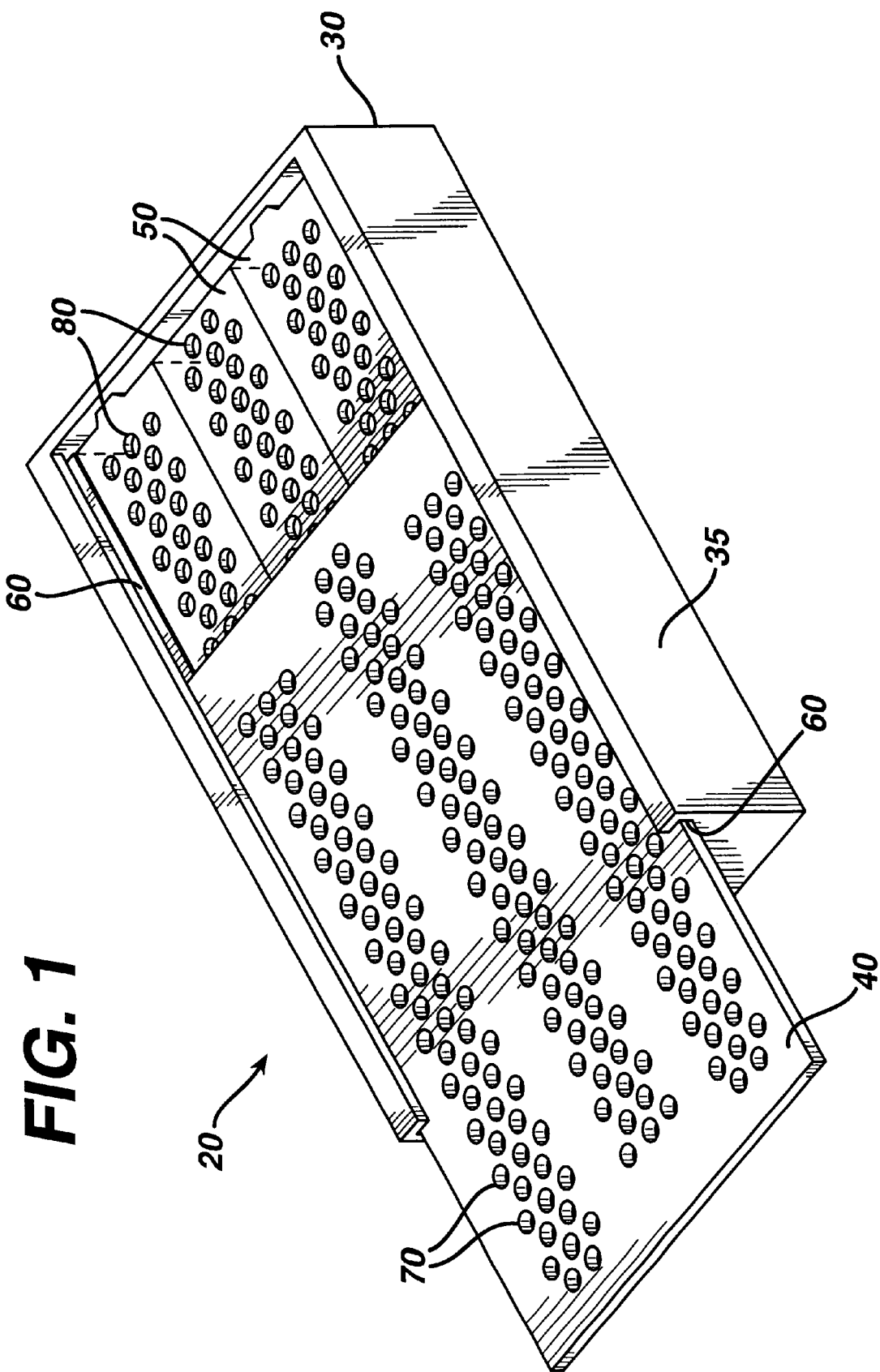
FIG. 1 is a perspective view of an embodiment of a battery cartridge.

Referring to FIGS. 1–3, a rectangular prismatic battery cartridge 20 includes a casing 30, a slide 40, and three batteries 50 located inside casing 30. Casing 30 is shaped as a rectangle having a wall 35 extending around the periphery of the rectangle. Portions of wall 35 extending along a width and along the lengths of wall 65 define grooves 60 for receiving slide 40. As described below, casing 30 further defines three sets of notches (not shown) within grooves 60 for receiving projections 100 defined by slide 40. Each set of notches is formed at predetermined positions, e.g., corresponding to a telephone's different modes of operation.

Figure 4A:
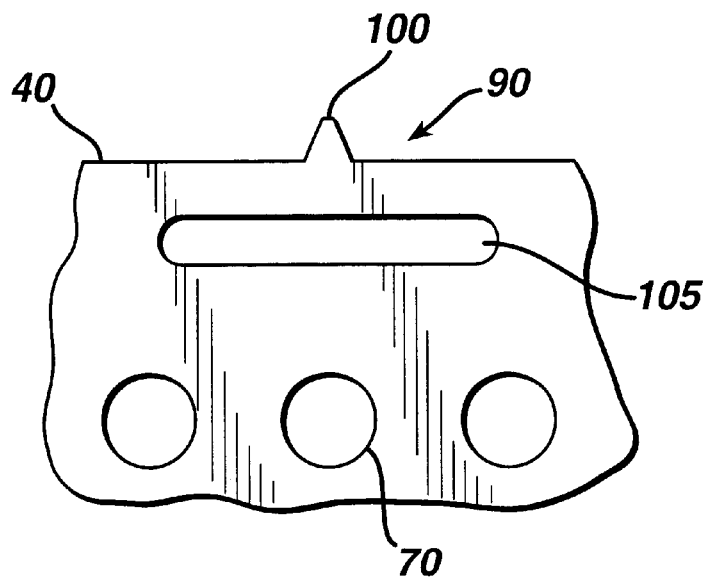
FIGS. 4A and 4B are top views of a latch in an extended and a retracted position, respectively.
Figure 4B:
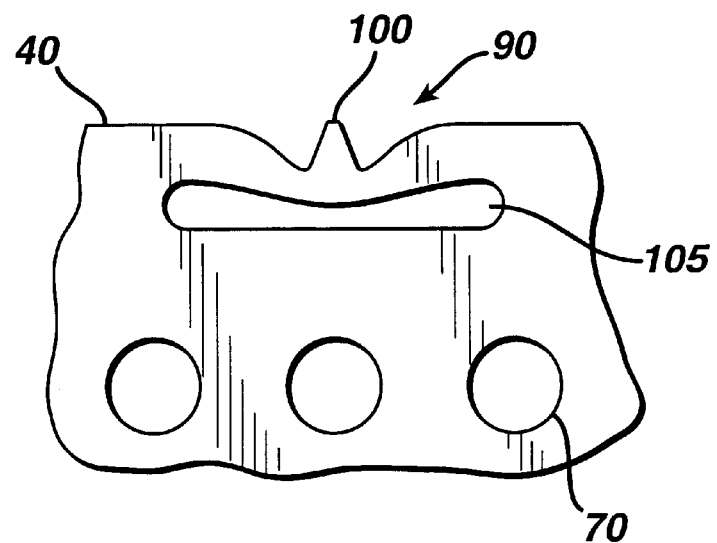

Slide 40 is shaped as a rectangle configured to slide into grooves 60, thereby mating with casing 30 to form cartridge 20. Slide 40 further defines a plurality of slide openings 70 to allow air flow into cartridge 20. Referring to FIGS. 2 and 4A–B, slide 40 also defines a plurality of latching mechanisms 90 formed on the sides of slide 40. Each latching mechanism 90 includes a projection 100 and a void 105 define by slide 40. When slide 40 is slid within groove 60, projections 100 can extend away from slide 40 and engage the notches defined by casing 30, which holds slide 40 at different predetermined positions corresponding to different modes of operation of the device (FIG. 4A). When slide 40 is slid to disengage projections 100 from the notches, e.g., to move slide 40 from one mode to another mode of operation, projection 100 deforms toward slide 40 and into void 105 to allow slide 40 to move within grooves 60 (FIG. 4B).

Batteries 50 are prismatic metal-air batteries configured to fit in casing 30. Similar to slide openings 70 on slide 40, batteries 50 also define a plurality of battery openings 80 for air to enter into batteries 50. Generally, slide openings 70 and battery openings 80 are patterned on slide 40 and batteries 50, respectively, to provide optimal and uniform performance of batteries 50.

In operation, the amount of air flow into batteries 80 is managed by moving slide 40 within grooves 60 until latches 90 engage with a set of the notches. Depending on which set of notches the latches 90 have engaged, slide openings 70 and battery openings 80 are completely misaligned (no overlap), partially aligned (some overlap), or completely aligned (total overlap).

Figure 5A:
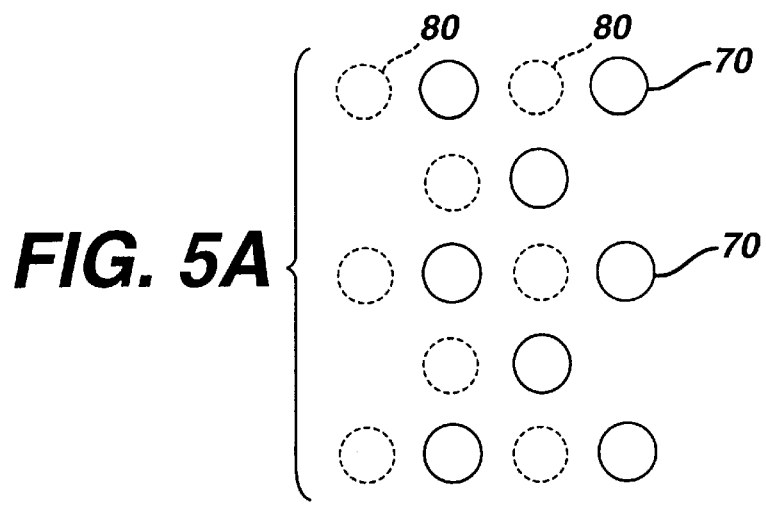
FIGS. 5A, 5B and 5C are schematic views of slide openings and battery openings being misaligned, partially aligned, and aligned, respectively.
Figure 5B:
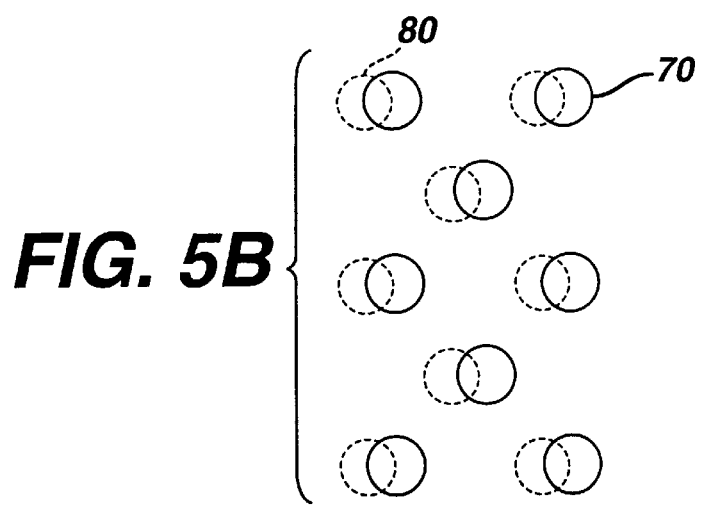
Figure 5C:
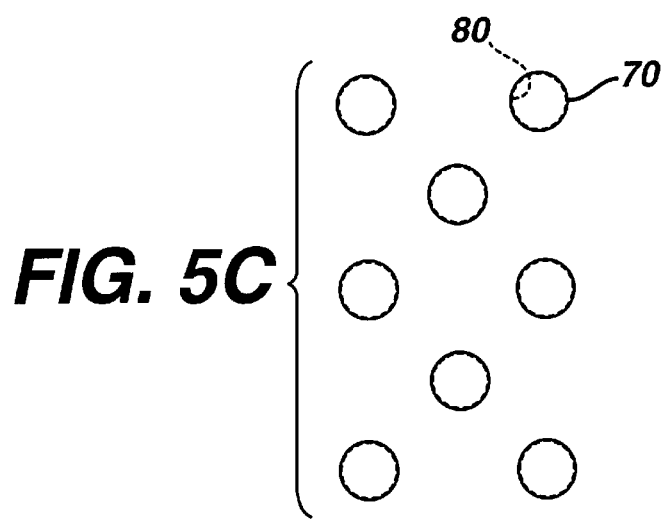

Referring to FIG. 5A, when the device is in an "off" mode, slide openings 70 and battery openings 80 are completely misaligned. Casing 30 and slide 40 tightly and sufficiently seal batteries 50 from the environment. Air flow into batteries 50 is restricted to enhance the service life of batteries 50, e.g., by protecting batteries 50 from self-discharge and by minimizing premature degradation of battery materials from excessive exposure to air. Referring to FIG. 5B, when the device is in a "standby" mode, slide openings 70 and battery openings 80 are partially aligned. Air flow into batteries 50 is balanced so that a sufficient amount of air may enter batteries 50 to satisfy the device's power requirements during standby mode. Referring to FIG. 5C, when the device is in an "on" or "talk" mode, slide openings 70 and battery openings 80 are completely aligned. In this mode, sufficient air may enter batteries 50 to allow batteries 50 to operate at full current levels.

Slide 40 can be moved manually by the user of the device according to the mode in which the user wants to use the device. For example, slide 40 can be connected to an external switch on a telephone so that the user can manually move slide 40 according to the power needs of the telephone. Slide 40 can also be moveably connected to, e.g., a cover plate of the telephone. When the cover plate is closed, slide 40 is moved so that projections 100 engage with the notches corresponding to the off mode. When the cover plate is opened, slide 40 is moved so that projections 100 engage with the notches corresponding to the on mode.

Figure 6:
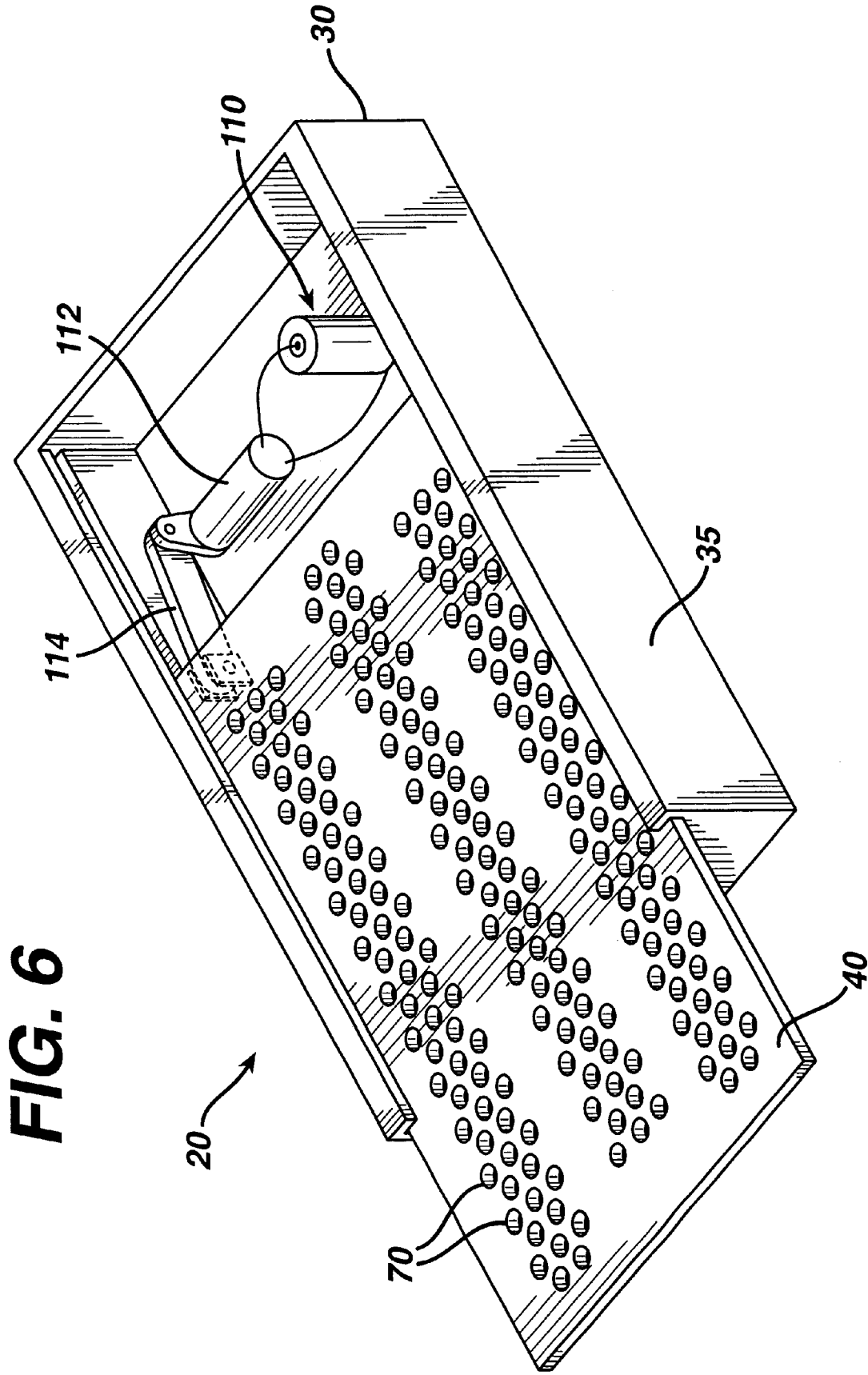
FIG. 6 is a schematic view of an embodiment of a battery cartridge having an auxiliary power source.

Referring to FIG. 6, in another embodiment, cartridge 20 includes an auxiliary power source 110 for automatically moving slide 40, which provides a seamless and transparent user interface. Furthermore, because battery 50 can produce an initial voltage drop upon startup of the device, auxiliary power source 110 can be used to reduce the voltage delay until battery 50 is ready for use. Auxiliary power source 110, e.g., a lithium/manganese dioxide battery, is interfaced with the device via a motor 112 and a link 114 adapted to move slide 40 within groove 60. The motor is actuated by signals sent from the device, e.g., according to the telephone's mode of operation. The specific movement of slide 40 depends on the type of telephone in which battery cartridge 20 is used. For example, slide 40 can move from the off mode to the standby mode when the user pushes an "on" button. Slide 40 can move from the standby mode to the talk mode when there is an incoming call or when the user starts dialing an outgoing call by depressing a number pad. Slide 40 can move from the talk mode to the standby or off mode when the user pushes the "end" button. Thus, slide 40 moves automatically according to the telephone's power requirements from battery 50, while prolonging the life of battery 50.

Casing 30 and slide 40 can be formed of any material suitable for use in the device. For example, casing 30 and slide 40 can be made from a non-conductive material using a variety of known techniques, such as a strong thermoplastic that can be injection molded, e.g., acrylonitrile-butadiene-styrene (ABS). Accordingly, the notches and latches 90 can be integrally formed with casing 30 and slide 40, respectively, e.g., during injection molding. Casing 30 and slide 40 can also be formed, e.g., from a lightweight metal having an electrically non-conductive coating. Specific dimensions of cartridge 20 depend on the application of cartridge 20, e.g., the size of a battery compartment of the telephone.

Figure 7:
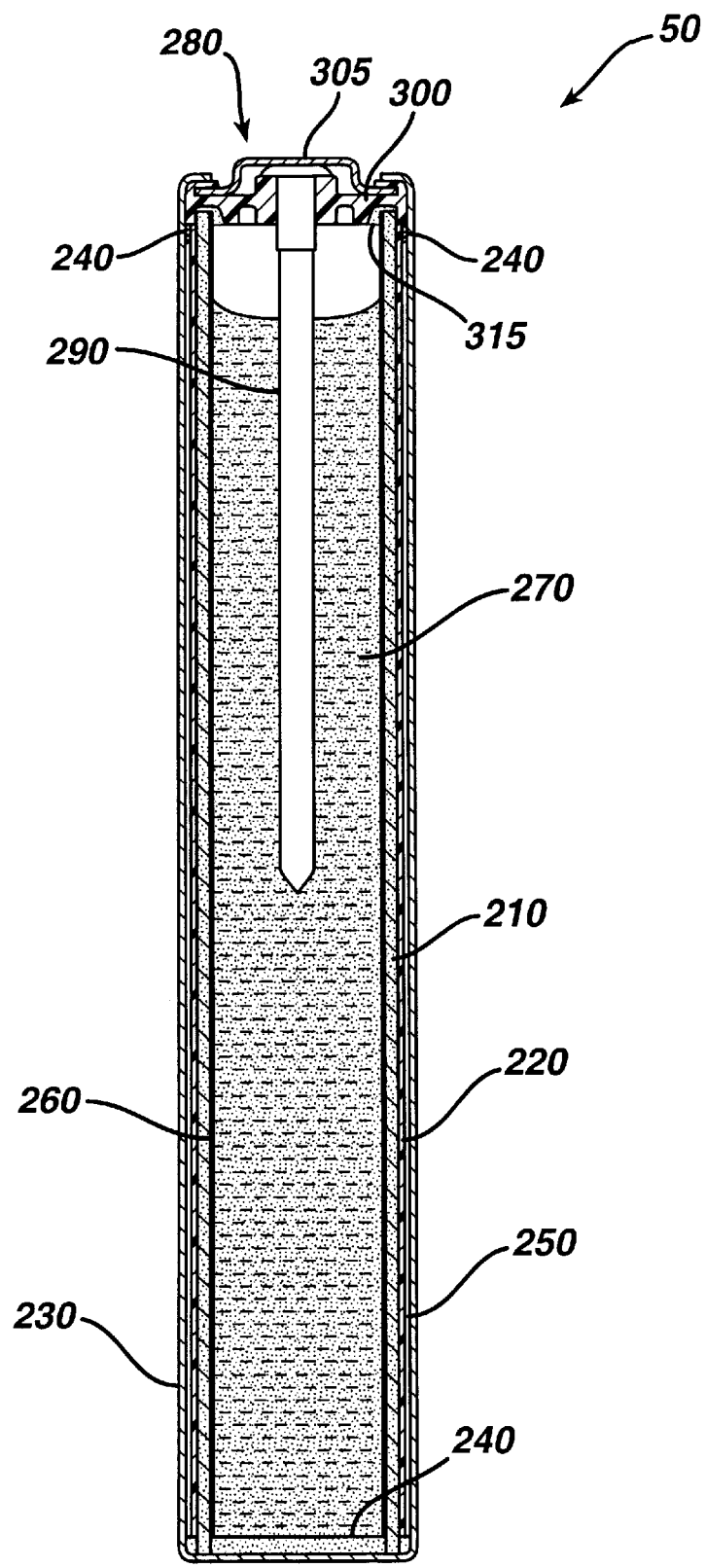
FIG. 7 is an elevational cross-sectional view of an embodiment of a battery.

Referring to FIG. 7, battery 50 is a prismatic metal-air battery with a rectangular or square cross section and having dimensions that allow battery 50 to be placed in cartridge 20. A prismatic cathode tube 210 is formed from a current collector, e.g., a metal mesh screen, coated with an active cathode coating mixture. The mixture is composed of a binder, carbon particles, and a catalyst for reducing peroxide, such as a manganese compound. Useful catalysts include manganese oxides, such as $Mn_2O_3$, $Mn_3O_4$, and $MnO_2$, that can be prepared, for example, by heating manganese nitrate or by reducing potassium permanganate. A preferred binder includes polytetrafluoroethylene (PTFE) particles. After the cathode coating mixture has hardened, the cathode assembly is heated to remove any residual volatiles from the cathode structure.

The outside of tube 210, which faces battery openings 80, can be covered by a PTFE barrier membrane 220. Membrane 220 helps maintain a consistent humidity level in battery 50. Membrane 220 also helps to prevent the electrolyte from leaking out of the cell and $CO_2$ from leaking into the cell.

A separator 260 is placed in cathode tube 210. Separator 260 can be a porous, electrically insulating polymer, such as polypropylene, that allows the electrolyte to contact the cathode.

The dimensions of air plenum 250 are a function of the application for battery pack 10 and/or the performance of the cathode. For example, how much current is desired from battery pack 20 and how well the cathode in battery 50 can operate at low oxygen concentrations can affect the design of air plenum 250. Generally, after the application of pack 20 and/or the performance of the cathode is determined, air plenum 250 is designed such that air flow smoothly decays from a first battery opening to a point on the exterior surface of cathode 210 that is equidistant from the first battery opening and a battery opening adjacent to the first battery opening. This design can provide cathode 210 with uniform air flow for uniform battery performance.

Figure 8:
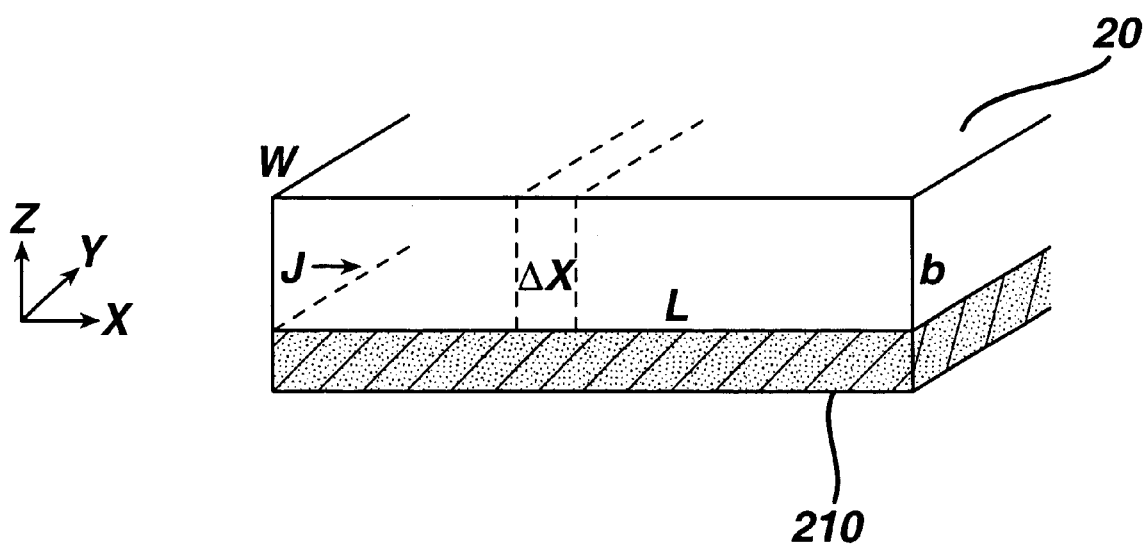
FIG. 8 is a schematic view of a portion of an embodiment of a battery cartridge.

More particularly, air plenum 250 is designed by an approximation method in which Fick's First Law $$\left(J_r = -D\frac{\partial C}{\partial r}\right)$$

is applied to a one-dimensional, steady-state system. FIG. 8 shows a portion of battery pack 20, wherein b is the height of air plenum 250 (e.g., less than about 1 cm, and less than about 0.1 cm, e.g., 0.08 cm), w is the hole-to-hole spacing (as measured from center to center, e.g., from about 0.1 cm to about 1 cm, e.g., about 0.2 cm), and L is the length of air plenum 250 (e.g., about 1.5 cm). The mass transport of oxygen within air plenum 250 can be characterized generally as:

(accumulation of material)=[generation of $O_2$+influx of $O_2$]− −[outflux of $O_2$+consumption of $O_2$]   (1)

For a metal-air battery, no oxygen is generated.
Applying Fick's First Law, Equation (1) can be written as:

$$J_x bw - \left(J_x bw + \frac{\partial J_x}{\partial x} bw\Delta x\right) - \left(\frac{\Delta x}{L}\right)\frac{I_{total}}{nF} = wb\Delta x\frac{\partial C}{\partial t} \quad (2)$$

where

| | | |
|---|---|---|
| $J_x$ | = | the diffusional flux of oxygen in the x-direction |
| $\frac{\partial J_x}{\partial x}$ | = | the rate of change of flux across a control volume; |
| $\Delta x$ | = | the thickness of the control volume; |
| $I_{total}$ | = | amount of current drawn over a specified area, e.g., 300 mA/cm²; |
| n | = | number of electrons involved in reducing oxygen (4); |
| F | = | Faraday's constant (96,485 coulombs/equivalent); and |
| $\frac{\partial C}{\partial t}$ | = | the accumulation rate of material in the control volume over time. |

Using algebra, Equation (2) can be rewritten as Equation (3) and then as Equation (4):

$$-\frac{\partial J_x}{\partial x} bw\Delta x - \left(\frac{\Delta x}{L}\right)\frac{I_{total}}{nF} = wb\Delta x\frac{\partial C}{\partial t} \quad (3)$$

$$-\frac{\partial J_x}{\partial x} - \left(\frac{1}{bwL}\right)\frac{I_{total}}{nF} = \frac{\partial C}{\partial t} \quad (4)$$

where $\frac{\partial C}{\partial t}$ = the difference in concentration between two points in time.

As shown in Equation (5), the concentration of oxygen in the air plenum includes a steady-state component ($C_s(x)$) and a transient component ($C_t(x,t)$).

$$C(x,t)=C_t(x,t)+C_s(x) \quad (5)$$

However, for the approximation method used herein, only the steady-state component is considered. Accordingly, Equation (4) becomes:

$$D\frac{\partial^2 C}{\partial x^2} - \frac{I_{total}}{bwLnF} = 0 \quad (6)$$

where D is the diffusion coefficient.
Using the ideal gas law, Equation (6) can be converted to Equation (7):

$$\frac{\partial^2 P}{\partial x^2} - \frac{RTI_{total}}{DbwLnF} = 0 \quad (7)$$

where P=pressure; R=the universal gas constant; and T=temperature.

Integrating Equation (7) twice yields Equation (8):

$$P = \frac{RTI_{total}}{2DbwLnF}x^2 + C_1 x + C_2 \quad (8)$$

Defining $$P_{x=0}=P_1, \quad (10)$$

and $$P_{x=L}=P_0 \quad (11)$$

where $P_1$=atmospheric pressure, e.g., 0.21 atm $O_2$; and $P_0$=a minimum pressure, such as, for example, less than about 0.21 atm, e.g., less than about 0.15 atm, and less than about 0.1 atm, and less than about 0.05 atm.

Solving for $C_1$ and $C_2$ yields:

$$C_1 = \left(\frac{P_o - P_l}{L}\right) - \frac{RTI_{total}}{2DbwLnF}L \quad (12)$$

Substituting Equations (10)–(13) back into Equation (8) yields:

$$P = \frac{RTI_{total}L}{2bDwnF}\left[\left(\frac{x}{L}\right)^2 - \left(\frac{x}{L}\right)\right] + (P_o - P_l)\left(\frac{x}{L}\right) + P_l \quad (14)$$

Equation (14) is used to design air plenum 250. Generally, for a given plenum design, all variables in Equation 14 are held constant, except for the plenum height (b) and the pressure (P). The values for some of the variables held constant, e.g., $P_0$, are chosen empirically. The values for other variables, such as the plenum length (L) and the amount of current desired ($I_{total}$), may be dictated by or restricted by the practical application of battery pack 10, e.g., the size restrictions of the device in which pack 10 is used, and/or the performance of the cathode.

Equation 14 is then iterated using different plenum heights (b) until the equation produces a pressure (P) distribution or profile that smoothly decays, e.g., sloping downward like a polynomial function, from atmospheric pressure (e.g., about 0.21 atm of $O_2$ at standard temperature and pressure (STP)) to a minimum pressure. The minimum pressure, determined empirically, is chosen to provide good battery performance. Preferably, the minimum pressure ($P_0$) is about 0 to about 0.21 atm of $O_2$, e.g., about 0.1 atm.

To assemble battery 50, cathode tube 210, which is wrapped with barrier membrane 220 and includes separator 260, is placed in a prismatic can 230 having battery openings 80. For sealing the cathode, can 230 may include a conductive hot melt 240, e.g., a polyamide loaded with carbon, graphite, or nickel. The cathode current collector should electrically contact the bottom of can 230. Electrical contact may be made by providing direct physical contact between the cathode current collector and the bottom of the can, for example, by welding the current collector to the bottom of the can. Alternatively, a conductive tab can be attached to both the current collector and to the bottom of the can. Cathode tube 210 and can 230 together define an air plenum 250 therebetween.

After cathode tube 210 is inserted, the inner cavity formed by separator 260 and cathode tube 210 is then filled with anode gel 270.

Anode gel 270 contains a mixture of zinc and electrolyte. The mixture of zinc and electrolyte can include a gelling agent that can help prevent leakage of the electrolyte from the cell and helps suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc.

Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety.

The particles of the zinc can be spherical or nonspherical. For example, the zinc particles can be acicular in shape (having an aspect ratio of at least two). The zinc material includes a majority of particles having sizes between 60 mesh and 325 mesh. For example, the zinc material can have the following particle size distribution:

0–3 wt % on 60 mesh screen;

40–60 on 100 mesh screen;

30–50 w t% on 200 mesh screen;

0–3 wt % on 325 mesh screen; and

0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

After anode gel 270 has been placed into can 230, a pre-assembled top assembly 280 is placed on the top of can 230. Top assembly 280 includes a seal 300, a current collector 290, and an end cap 305 welded to current collector 290. Current collector 290 is made from a suitable metal, such as brass. Seal 300 can be made, for example, of nylon. Additional non-conductive hot melt 315 (BiWax Corp.) is placed between seal 300 and cathode tube 210 to minimize leakage of the electrolyte and anode material. The upper external periphery (i.e., the lip) of can 230 is then swaged down over pre-assembled top assembly 280 to seal top assembly 280 at the top of can 230.

During storage, battery 50 can be covered with a removable sheet that covers battery openings 80. The sheet, for example, an oxygen-impermeable and hydrogen permeable sheet, restricts the flow of air between the interior and exterior of the battery. The user peels the sheet from the battery prior to use to allow oxygen from the air to enter the interior of the battery. The battery can also be stored in a sealed metal bag. The user removes the battery from the bag before use.

Metal-air batteries and methods of making them are described in U.S. Ser. No. 09/374,277, filed Aug. 13, 1999; U.S. Ser. No. 09/374,278, filed Aug. 13, 1999; U.S. Ser. No. 09/416,799, filed Oct. 13, 1999; U.S. Ser. No. 09/427,371, filed Oct. 26, 1999; and U.S. Ser. No. 09/494,586, filed Jan. 31, 2000, all hereby incorporated by reference in their entirety.

Figure 9:
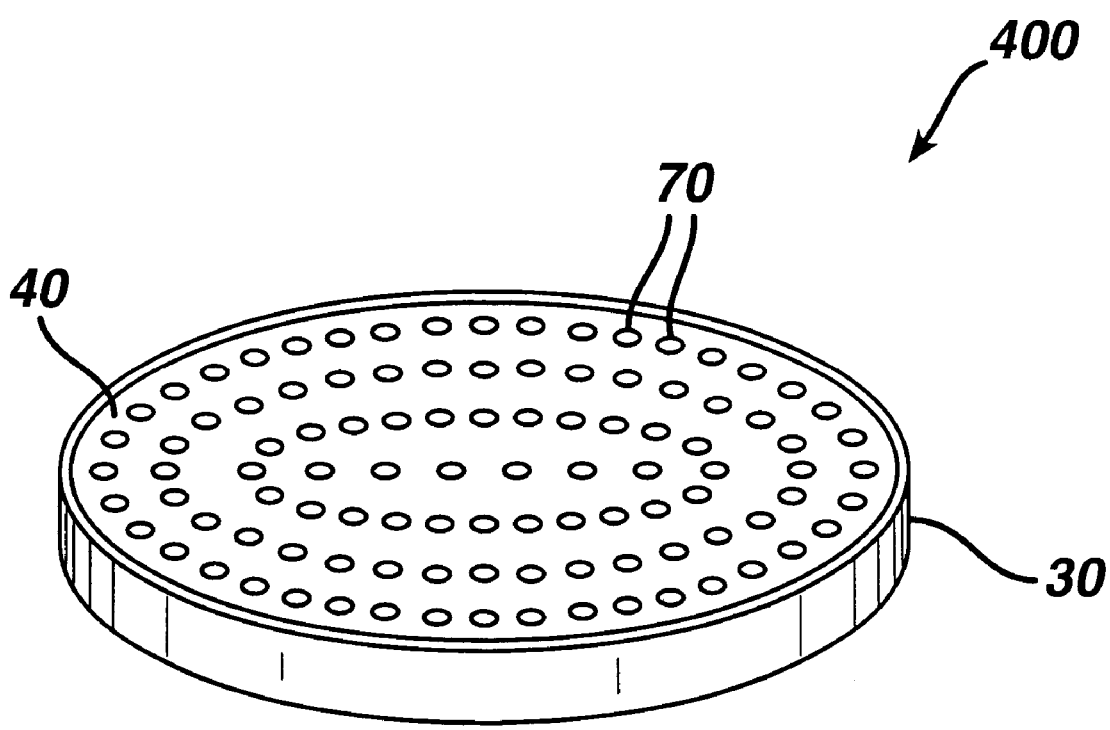
FIG. 9 is a perspective view of an embodiment of a battery cartridge.

While certain embodiments have been described, other embodiments are contemplated. For example, cartridge 20 may not include latches 90 and notches. Cartridge 20 is also not limited to a rectangular shape but can be formed in other shapes, such as, for example, a circular prismatic cell 400, e.g., a button cell and a wafer cell, shown in FIG. 9. Accordingly, batteries 50 can be formed in other shapes configured to fit in cartridge 20. Batteries 50 can also be formed as one unit, e.g., having the dimensions of three individual batteries placed side-by-side. Groove 60 can be formed as part of a slide-retaining frame that is heat staked or welded to casing 30, rather than being integrally formed with casing 30. Furthermore, while the device described above is a telephone, it should be recognized that cartridge 20 can be used with other electronic devices, e.g., a walkie-talkie, a radio, a computer, and palmtop personal digital assistant. Because these devices may not require a standby mode of operation, cartridge 20 should be configured accordingly to provide the proper alignments between battery openings 80 and slide openings 70. Other configurations for openings 70 and 80 are possible. For example, openings 70 and 80 can be slots, or one opening extending on slide 40 and battery 50, respectively.

Figure 10:
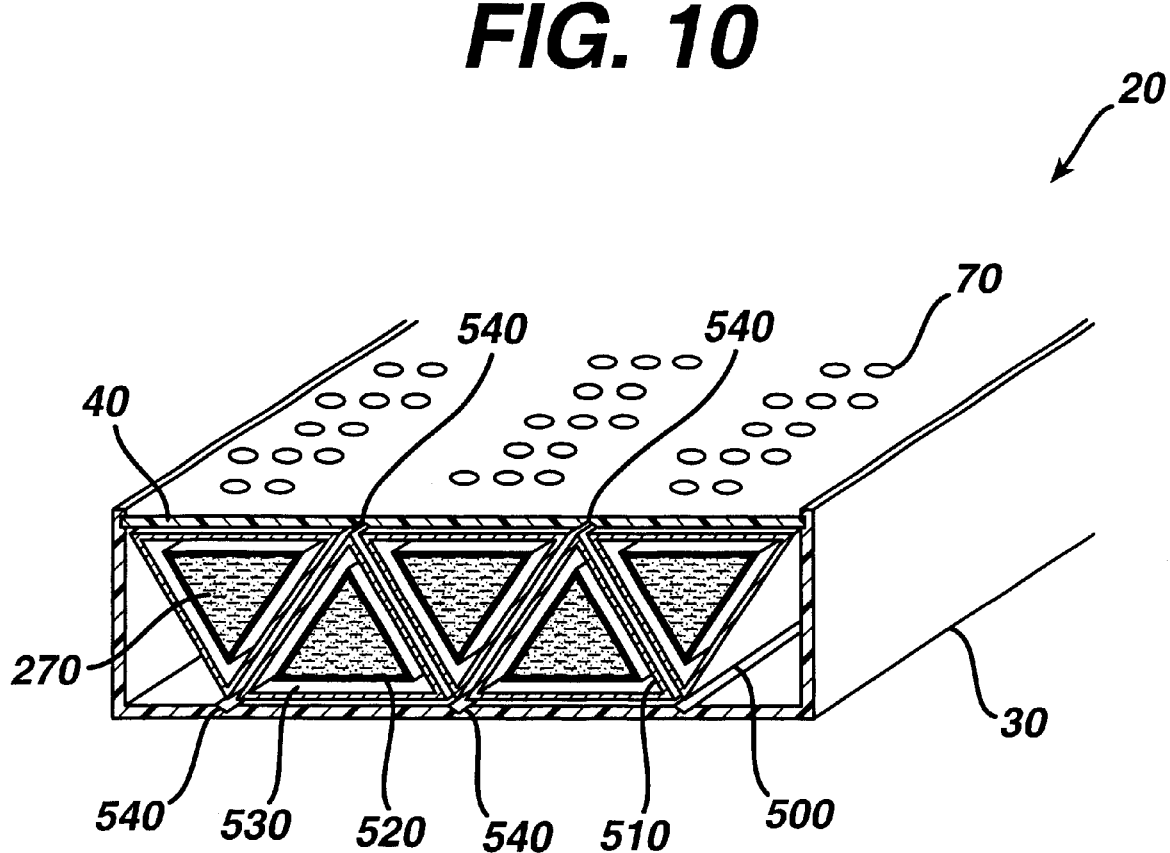
FIG. 10 is a schematic, perspective view of an embodiment of a battery cartridge.

FIG. 10 shows another embodiment of battery cartridge 20. Casing 30 and slide 40 are generally as described above. Battery 500, which is generally similar to battery 50, has the form of a triangular prism, e.g., an elongated structure with a triangular cross section. Can 510 with battery openings (not shown) and cathode 520 are formed as triangularly prismatic tubes to define air plenum 530 therebetween. Anode 270, barrier membrane (not shown), and separator (not shown) are placed in can 510 generally as described above. In some embodiments, casing 30 and/or slide 40 includes V-shaped grooves 540 to position batteries 500 in place. Grooves 540 may contain a sealant.

Batteries 500 can be formed as generally described above for battery 50. Batteries 500 can be formed with only two folds on can 510, and therefore, only one seam is produced. By offsetting the angles, batteries 500 can be packed in cartridge 20 efficiently; and the batteries have relatively high surface area.

All publications and patents mentioned in this application are herein incorporated by reference to the same extent as if each individual publication or patent was specifically and individually indicated to be incorporated by reference.

Other embodiments are in the claims.

What is claimed is:

1. A battery cartridge, comprising:

a casing;

a battery in the casing, the battery comprising an opening; and a slide moveably engaged with the casing, the slide comprising an opening alignable with the opening of the battery.

2. The cartridge of claim 1, wherein
   the slide is moveable between a first position in which the opening of the slide is aligned with the opening of battery, and a second position in which the opening of the slide is misaligned with the opening of battery.

3. The cartridge of claim 1, wherein
   the slide is further moveable to a third position in which the opening of the slide is partially aligned with the opening of the battery.

4. The cartridge of claim 1, wherein
   the casing defines a groove, and
   the slide is moveably engaged in the groove.

5. The cartridge of claim 1, wherein
   the slide further comprises at least one latch, the latch retaining the slide at a predetermined engagement position with the casing.

6. The cartridge of claim 5, wherein the latch is integrally molded in the slide.

7. The cartridge of claim 1, further comprising:
   an auxiliary power source adapted to move the slide.

8. The cartridge of claim 7, wherein the auxiliary power source is a second battery.

9. The cartridge of claim 1, wherein the casing has a prismatic shape.

10. The cartridge of claim 9, wherein the casing has the shape of a rectangular prism.

11. The cartridge of claim 9, wherein the casing has the shape of a circular prism.

12. The cartridge of claim 1, wherein the battery has a rectangular cross section.

13. The cartridge of claim 1, wherein the battery has a triangular cross section.

14. The cartridge of claim 1, wherein the battery is a metal-air battery.

15. The cartridge of claim 14, wherein the metal-air battery comprises a cathode comprising manganese dioxide.

16. The cartridge of claim 14, wherein the metal-air battery comprises an anode comprising zinc.

17. An electrochemical power source, comprising:
    a metal-air battery system including an opening and air control member arranged for relative sliding motion to variably cover the opening for controlling exposure to an oxygen-containing environment.

18. An electrochemical power source, comprising:
    a metal-air battery system including a pair of openings in parallel planar arrangement, the openings being arranged for variable alignment to control exposure to an oxygen-containing environment.

* * * * *